(No Model.)
E. ATKINSON.
DISH CLEANER.
No. 560,673. Patented May 26, 1896.
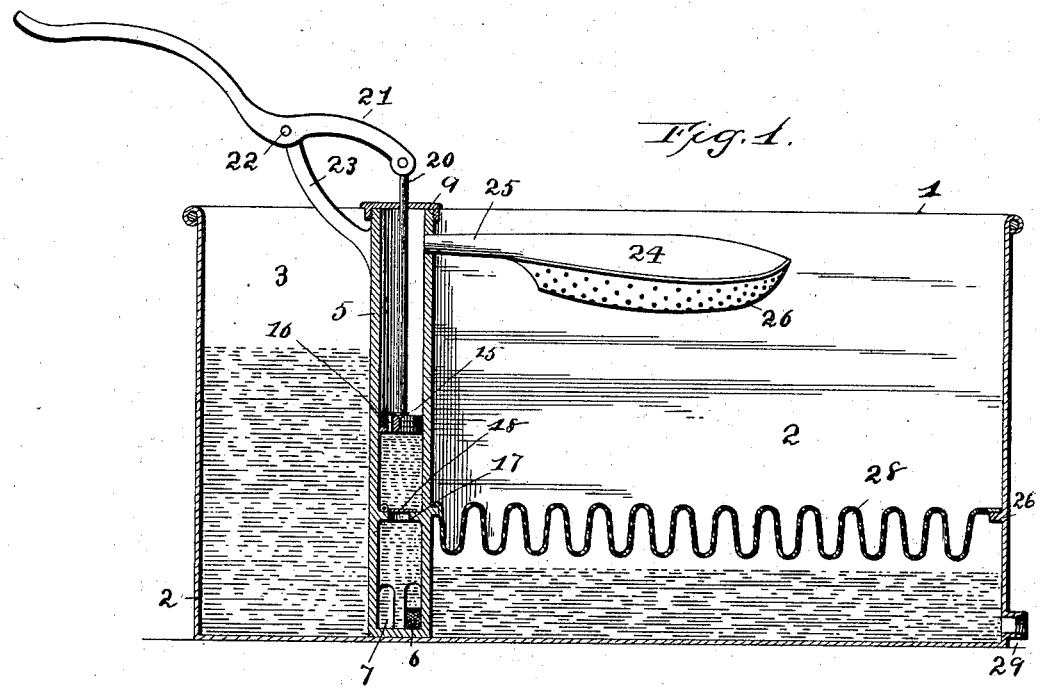
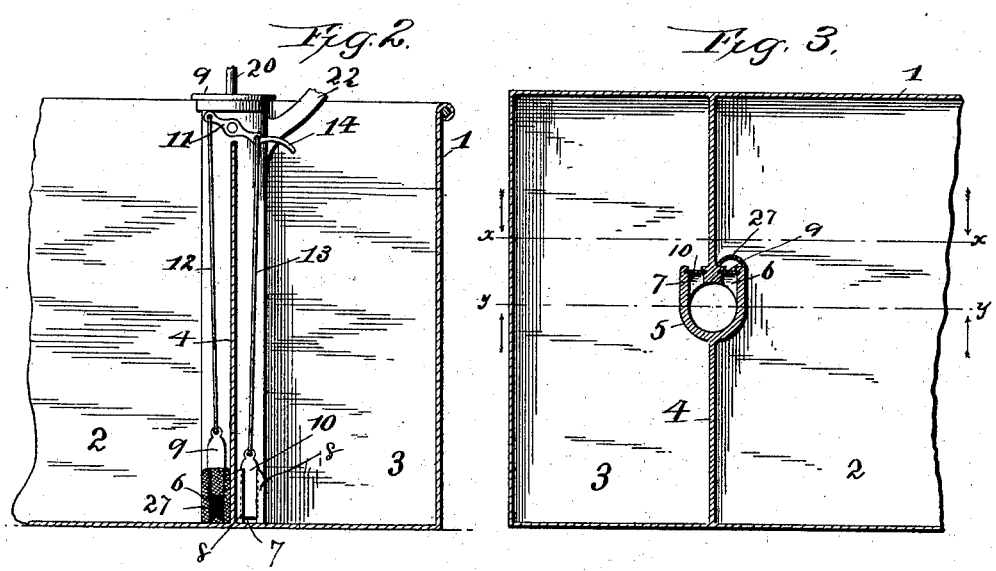
Witnesses
EC Wurdeman
S. Williamson
Inventor
Empson Atkinson
By Geo. H. Holgate
Attorney

UNITED STATES PATENT OFFICE.

EMPSON ATKINSON, OF WOODSTOWN, NEW JERSEY.

DISH-CLEANER.

SPECIFICATION forming part of Letters Patent No. 560,673, dated May 26, 1896.

Application filed August 8, 1895. Serial No. 558,650. (No model.)

*To all whom it may concern:*

Be it known that I, EMPSON ATKINSON, a citizen of the United States, residing at Woodstown, in the county of Salem and State of New Jersey, have invented certain new and useful Improvements in Dish-Washers, of which the following is a full, clear, and exact specification.

My invention relates to a new and useful improvement in dish-washers, and has for its object to provide such a device that will be simple in construction, effective in operation, and by the use of which, after dishes have been washed, they may be thoroughly rinsed with clean water.

With these ends in view the invention consists in the details of construction and combination of elements hereinafter set forth, and then specifically designated by the claims.

In order that those skilled in the art to which my invention appertains may understand how to make and use the same, I will describe its operation and construction in detail, referring by number to the accompanying drawings, forming a part of this specification, and in which—

Figure 1 is a central vertical longitudinal section taken at the line *y y* of Fig. 3, looking in the direction of the arrows. Fig. 2 is a like section of one end of the device, taken at the line *x x*, looking in the direction of the arrows adjacent thereto; and Fig. 3 is a horizontal section of one end of the device.

Similar numbers denote like parts in all the views of the drawings.

1 is a tank of any construction and divided into the compartments 2 and 3 by the partition 4.

5 is a pump, so placed relative to the partition that the openings 6 and 7 at the bottom thereof communicate with the compartments 2 and 3, respectively. Upon the outer wall of the pump, at the bottom thereof, are arranged the ways 8, in which slide suitable gates 9 and 10, whereby the openings 6 and 7 are thrown into and out of communication with their respective compartments, for the purpose hereinafter set forth.

Pivoted to the upper portion of the pump is a rocking lever 11, connecting with the gates 9 and 10 by the rods 12 and 13, and 14 is a handle by which the lever may be conveniently manipulated for the purpose of opening and closing said gates. Within the pump-barrel runs a plunger 15, of any construction adapted to bring about the results aimed at, and which is provided with the valve 16, through which the water will flow when the plunger is forced downward and which will prevent the water from repassing to the lower portion of the barrel when the plunger is moved upward, as is usual in pumps of this character.

17 is a valve-seat formed within the barrel above the openings 6 and 7, and provided with a suitable valve 18, whereby water drawn above said valve-seat by the plunger will be prevented from returning below the said valve-seat. The upper portion of the pump-barrel is closed by a cap 19, and through this cap passes the plunger-rod 20, by which motion is imparted from a handle 21 to said plunger, and this handle is pivoted at 22 to a bracket 23, supported by the barrel.

24 is a nozzle, of any desired shape and size, having a stem 25, which penetrates the pump at its upper portion and communicates with the inside of the barrel thereof. The portion 26 of this nozzle is perforated, so that water passing through said nozzle will be disintegrated and thrown into small diverging streams with great force downward within the compartment 2. Supported within the compartment 2 upon suitable ledges 26 is a perforated and corrugated false bottom 28, so formed as to receive the edges of plates and the like and prevent them from falling flat or against each other, so that it will be seen that dishes placed within the compartment 2 upon this false bottom will be held in such a position as to be most advantageously acted upon by the diverging streams of water issuing from the nozzle.

From this description the operation of my improvement will be obviously as follows: Plates or dishes having been placed as just described and a sufficient amount of hot water poured in the compartments 2 and 3, the rocking lever 11 is so manipulated as to open the gate 9 and close the gate 10, when the pump is put into operation and the water drawn from the compartment 2 into the barrel of the pump and forced from thence through the nozzle 24 with the desired force to cleanse all the dishes within said compartment. After having passed from the dishes this water will again drain into the bottom of the compartment 2, from whence it may be again drawn by the pump and the operation of washing continued indefinitely without requiring the addition of new water, so that the dishes upon the false bottom are never immersed in the water by which they are washed, which is an advantage well understood.

After the dishes have been thoroughly washed by the application of the water in the compartment 2 the movement of the rocking lever is reversed, closing the gate 9 and opening the gate 10, thus establishing communication between the compartment 3 and the pump-barrel and excluding the water in the compartment 2 from said pump-barrel, when by operating the pump as before the clean water in the compartment 3 will be forced through the nozzle and upon the dishes, thereby thoroughly rinsing the same of the soiled water with which they were washed, and this is an advantage not gained in apparatus heretofore in use and is of great advantage in thoroughly cleansing dishes.

In order to prevent the pump becoming clogged from particles washed from the dishes, I provide a screen 27, which incloses the entrance to the opening 6, by which all fragments will be caught and readily removed by the hand, and after the operation of washing and rinsing has been completed and the dishes removed the water may be drawn off through the opening 29, which may be provided with any suitable spigot, and the two compartments may be put into communication by moving the rocking lever to a horizontal position, when both gates will be partially opened, permitting the water in the compartment 3 to flow through the lower portion of the pump and into the compartment 2, and from thence through the opening 29.

By the use of my improvement dishes may be quickly and thoroughly washed and rinsed with but little exertion upon the part of the operator and without immersing the hands in the water or using cloths, which soon become obnoxious. If found desirable, a cover may be provided for the tank 1, so as to prevent spilling of the water and also to retain the heat.

I am aware that slight modifications might be made in the construction shown and described without departing from the spirit of my invention, and I do not wish to be understood as limiting myself to the exact construction specified.

Having thus fully described my invention, what I claim as new and useful is—

1. In an apparatus of the character described, the tank 1, provided with compartments 2, and 3, false, corrugated bottom 28, arranged within the compartment 2, pump 5, having openings 6, and 7, gates 9, and 10, for controlling said openings, rocking lever 11, by which said gates are operated through suitable connections, and a nozzle communicating with said pump for delivering water therefrom in small streams upon the dishes to be washed, as specified.

2. The herein-described combination of the tank 1, having compartments 2, and 3, the pump 5, arranged between said compartments, openings 6, and 7, communicating with said compartments respectively, gates 9, and 10, for controlling said openings, rods 12, and 13, rocking lever 11, to which said rods are pivoted and by means of which said gates are operated, handle 14, by which said rocking lever is manipulated, suitable valves, plunger and handle for operating the pump and a nozzle connected with said pump, which is perforated, substantially as and for the purposes set forth.

In testimony whereof I have hereunto affixed my signature in the presence of subscribing witnesses.

EMPSON ATKINSON.

Witnesses:
S. S. WILLIAMSON,
M. B. ELTON,
FRANK WRIGHT.